US006604211B1

(12) United States Patent
Heiman et al.

(10) Patent No.: US 6,604,211 B1
(45) Date of Patent: Aug. 5, 2003

(54) TOOL FOR INITIATING AND ANALYZING ERROR RECOVERY PROCEDURES IN DATA STORAGE DEVICES

(75) Inventors: Errol Carl Heiman, Boulder, CO (US); Henry Elwood Davenport, Longmont, CO (US); Jack William Lakey, Boulder, CO (US); Robert James Hancock, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 469 days.

(21) Appl. No.: 09/645,464

(22) Filed: Aug. 23, 2000

Related U.S. Application Data
(60) Provisional application No. 60/151,739, filed on Aug. 31, 1999.

(51) Int. Cl.$^7$ ................................................ G06F 11/00
(52) U.S. Cl. ........................................ 714/41; 714/703
(58) Field of Search ............................ 714/41, 33, 52, 714/703; 369/30.21, 30.22, 53.12

(56) References Cited

U.S. PATENT DOCUMENTS

| | | | |
|---|---|---|---|
| 3,938,183 A | 2/1976 | Hust et al. | |
| 4,187,466 A | 2/1980 | Kasson et al. | |
| 4,290,023 A | 9/1981 | Greenfield | |
| 4,377,782 A | 3/1983 | Metcalf et al. | |
| 4,578,721 A | 3/1986 | Brannan, Jr. | |
| 4,623,942 A * | 11/1986 | Kraus et al. | ................. 360/75 |
| 4,759,019 A | 7/1988 | Bentley et al. | |
| 4,764,860 A * | 8/1988 | Takao | ......................... 369/43 |
| 5,121,263 A | 6/1992 | Kerwin et al. | |
| 5,150,050 A | 9/1992 | Genheimer et al. | |
| 5,355,261 A | 10/1994 | Taratorin | |
| 5,355,469 A | 10/1994 | Sparks et al. | |
| 5,557,183 A | 9/1996 | Bates et al. | |
| 5,654,841 A | 8/1997 | Hobson et al. | |
| 5,717,850 A | 2/1998 | Apperley et al. | |
| 5,737,342 A * | 4/1998 | Ziperovich | ................. 714/736 |
| 5,757,737 A * | 5/1998 | Tanaka | .................... 369/30.22 |
| 5,793,559 A | 8/1998 | Shepherd et al. | |
| 5,815,650 A | 9/1998 | Apperley et al. | |
| 5,832,199 A | 11/1998 | Apperley et al. | |
| 5,832,204 A | 11/1998 | Apperley et al. | |
| 5,872,910 A * | 2/1999 | Kuslak et al. | ................. 714/41 |
| 6,023,383 A | 2/2000 | Glover et al. | |
| 6,061,805 A | 5/2000 | Suzuki et al. | |
| 6,351,447 B1 * | 2/2002 | Takagi et al. | ............. 369/275.3 |
| 6,434,106 B1 * | 8/2002 | Ohtsuka | ..................... 369/116 |
| 6,484,269 B1 * | 11/2002 | Kopylovitz | .................... 714/5 |
| 6,526,006 B1 * | 2/2003 | Yoshimi et al. | .......... 369/44.28 |

* cited by examiner

Primary Examiner—Robert Beausoliel
Assistant Examiner—Bryce P. Bonzo
(74) Attorney, Agent, or Firm—Merchant & Gould P.C.

(57) ABSTRACT

A method and apparatus for initiating and analyzing an error recovery procedure in a data storage device is disclosed. Error recovery procedures are initiated by the simulation of an injected error event onto a particular location of the storage device. The simulation is implemented by corrupting the differential read signal of the storage device prior to error detection and decoding by the storage device. The operation and control of the software error recovery analysis tool is administered through a software application offering a graphical and interactive environment for measurement and automation. The application, corruption device, and a circuit designed to operate the timing and control of the tool are linked such that communication between the components defines the invention as a whole. During the signal corruption, the application allows the monitoring of any responses to the simulated error events by the data storage device.

20 Claims, 9 Drawing Sheets

TOOL FOR INITIATING AND ANALYZING ERROR RECOVERY PROCEDURES IN DATA STORAGE DEVICES

RELATED APPLICATIONS

This application claims priority of United States provisional application Serial No. 60/151,739, filed Aug. 31, 1999.

FIELD OF THE INVENTION

This application relates generally to the field of data storage devices and more particularly to a tool for analyzing the operation of the error recovery procedures programmed into data storage devices.

BACKGROUND OF THE INVENTION

One function of data storage devices is the reliable storage and retrieval of information. Using one common implementation of such storage devices as an example, data is stored in a disc drive on one or more discs coated with a magnetizable medium. Data is written to the discs by an array of transducers, typically referred to as read/write heads, mounted to a radial actuator for movement of the heads relative to the discs. The information is stored on a plurality of concentric circular tracks on the discs until such time that the data is read from the discs by the read/write heads. Each of the concentric tracks is typically divided into a plurality of separately addressable data sectors. The heads are used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

Typically, the heads are positioned with respect to the disc surfaces by an actuator voice coil motor. The voice coil motor is responsible for pivoting the actuator body about a pivot shaft, thus moving the heads across the disc surfaces. The actuator thus allows the heads to move back and forth in an accurate fashion between an inner radius and an outer radius of the discs. The actuator arm is driven by a control signal fed to the voice coil motor at the rear end of the actuator arm. A servo control system is used to sense the position of the actuator and control the movement of the head above the disc using servo signals read from the servo segments on the disc surface in the disc drive. The servo system relies on servo information stored on the disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the voice control motor to rotate the actuator to position the head over a desired new track or maintain the position over the desired current track.

Servo information is typically stored in a disc drive in one of two ways: sectored servo and dedicated servo. In a dedicated servo system, the servo information is stored on a separate dedicated disc surface which contains no user data. In this system, servo information is constantly available to the servo control system. In a sectored servo system, servo information is interspersed with user data stored on the disc surface. The servo information is stored in servo segments, also referred to as servo wedges, on each track of the disc surface. These segments are interspersed around the recorded track between stored user data on the track. The number of servo wedges in a recorded track varies depending on the disc architecture. The leading edge of each servo wedge on a particular track is detectable by monitoring drive signal servo gate pulses. As the disc rotates beneath the head, the head periodically samples the servo sectors to obtain the servo information for the servo system. In this system, servo information is constantly available to the servo control system.

Unpredictable errors may periodically occur in the retrieval of data from the magnetized discs. Therefore, storage device control systems are designed to detect errors and subsequently deliver the correct data if possible. Since errors occur randomly, error recovery procedure code designers must anticipate potential causes for error and formulate methods for dealing with them. In particular, a large portion of the storage device firmware is specifically devoted to analysis of errors and error recovery.

Conventional methods of testing the adequacy and function of error recovery procedures are primitive. The process requires operational testing of a large number of storage devices for extended periods of time in hopes of discovering a significant portion of error conditions. These approximate attempts to simulate single error conditions have proven time consuming and inefficient.

There are also different procedures for testing data storage devices in order to locate where an error condition may occur. In short, these procedures do not test the reaction of the firmware of the storage device, but instead only test whether or not the device has accumulated any errors, either during the manufacturing process or after considerable use. One such procedure, as detailed in U.S. Pat. No. 4,578,721, applied an inherent window margin to each track of the disc. The stored data was positioned under the inherent window 5% from the center of the cell, also 5% from its failure point. Hence, any noise or error would cause the data to fall outside the window, thus signaling an error condition. A similar conventional procedure designed to test the noise rejection capability of the storage device, injects noise into the device in order to monitor for data that may fall outside the window, thus signaling an error condition.

Another conventional form of such testing, as detailed in U.S. Pat. No. 5,654,841, injects a sinusoidal test signal of a predetermined magnitude and frequency into an incoming servo position error (SPE) signal in the servo loop. The SPE signal indicates the position of the head relative to the center of a track, whose identity is included in the prerecorded servo information. After the signal is injected, the gain in the servo loop is measured as a ratio of the magnitude of the incoming SPE (as a result of sampling and filtering the SPE prior to injection) over the magnitude of the modified SPE (as a result of the signal injection). An error condition is then recognized by any localized increase in gain over the frequency range. This error condition is visible as a result of the resonance in the disc drive structure induced by the injection of the test signal into the SPE. In a similar known method, errors in a data storage device can be found through the use of a frequency analyzer. The frequency analyzer injects energy of a selected frequency into the storage device and then evaluates the structure for gain and phase response in the energy range which would indicate a resonance. The resonant frequency is then used to determine if it is one of the "marked" frequencies common to a particular mechanical defect.

Although there is an abundant amount of prior art teaching error detection, there presently is a lack of ability to test the response of the firmware in light of any one of the unlimited number of error conditions (ie, servo errors, data field errors, etc.) that can occur. Unless there is a way to simulate these errors, it is not known how the firmware of the storage device will respond when such an error condition occurs.

SUMMARY OF THE INVENTION

Against this backdrop the present invention has been developed. The present invention is a means for invoking an error condition to observe the behavior of the error recovery system of the firmware. The software error recovery analysis tool, in accordance with the present invention, hereinafter called "SERAT," provides a precise, predictable, repeatable, adjustable, user-friendly means for creating errors in any portion of the read data signal prior to the initiation of any error detection or correction functions. By providing precise disruptions in the read signal of a data storage device, an error event is inherently introduced on a user-specified recorded track of information. This error event can corrupt anywhere from several cells to the entire track. These controlled error events provide a means for observing the ability of the data storage device (DSD) to deal with specific error conditions which may occur in normal operation of the device. Such observations can reveal errors or omissions in the error recovery procedures of the DSD.

In the preferred embodiment, SERAT creates an error event by effectively canceling both channels ($R_{dx}$ and $R_{dy}$) of the differential read signal by shorting both channels to DC common. The cancellation is administered through a probe which is specifically designed for each particular DSD. Any type of software offering a graphical and interactive environment for measurement and automation may implement the functional basis for the control of such error events. SERAT, in response to the customized routines initiated by the software, injects a disruption at a segment on the differential read signal corresponding to a location in the DSD specified by a user to be the placement of the error event. Precision of the duration of the error event (typically one nanosecond or less) is administered through a software-controlled combination of digital and analog timing circuits. This precise timing and control of the error event is one representative quality of the innovative aspects of SERAT.

Implementing the customized software routines with the graphical and interactive software, a user may create not only single error events, but also repeatable error events, multiple error events per track, exactly positioned error events, randomly positioned error events, and randomly-sized error events through simple, point and click controls of the graphical user interface. The application of the routines by the software provide for fixed, random, or sequential placement of error events on a specified number of consecutive rotations of the disc. Further, by repeating the error event on consecutive rotations, SERAT may provide a means for testing retry error procedures which are common to data storage equipment.

These and various other features as well as advantages which characterize the present invention will be apparent from a reading of the following detailed description and a review of the associated drawings.

DETAILED DESCRIPTION

Figure 1:
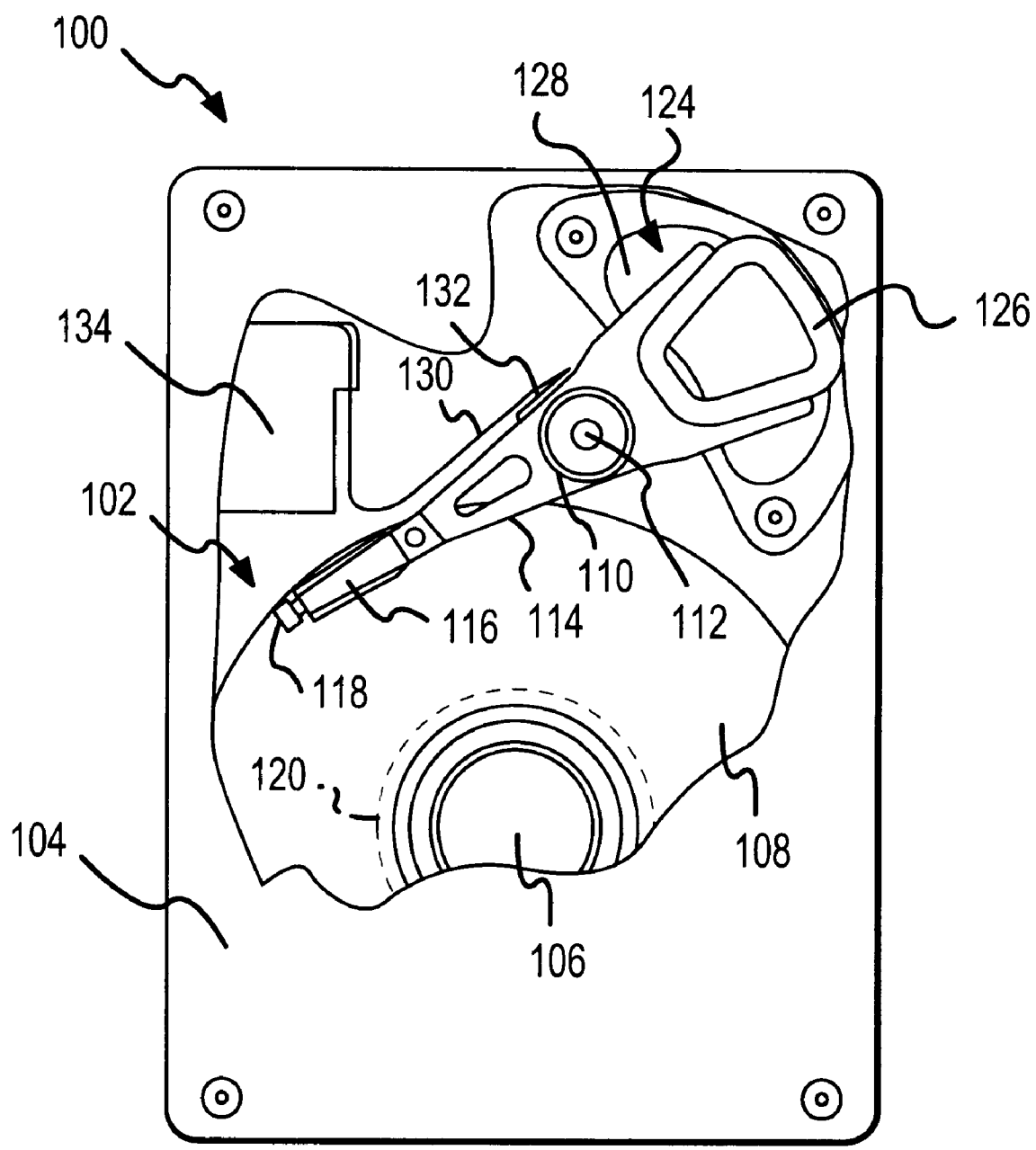
FIG. 1 is a plan view of a disc drive to be tested by the software error recovery tool (SERAT) in accordance with the present invention.

A disc drive 100 to be analyzed in accordance with a preferred embodiment is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks 162 (FIG. 2) on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer, or head, 118 which includes an air bearing slider enabling the head 118 to fly in close proximity above the corresponding surface of the associated disc 108.

During a seek operation, the track 162 position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads 118 are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier 152 (FIG. 2) for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
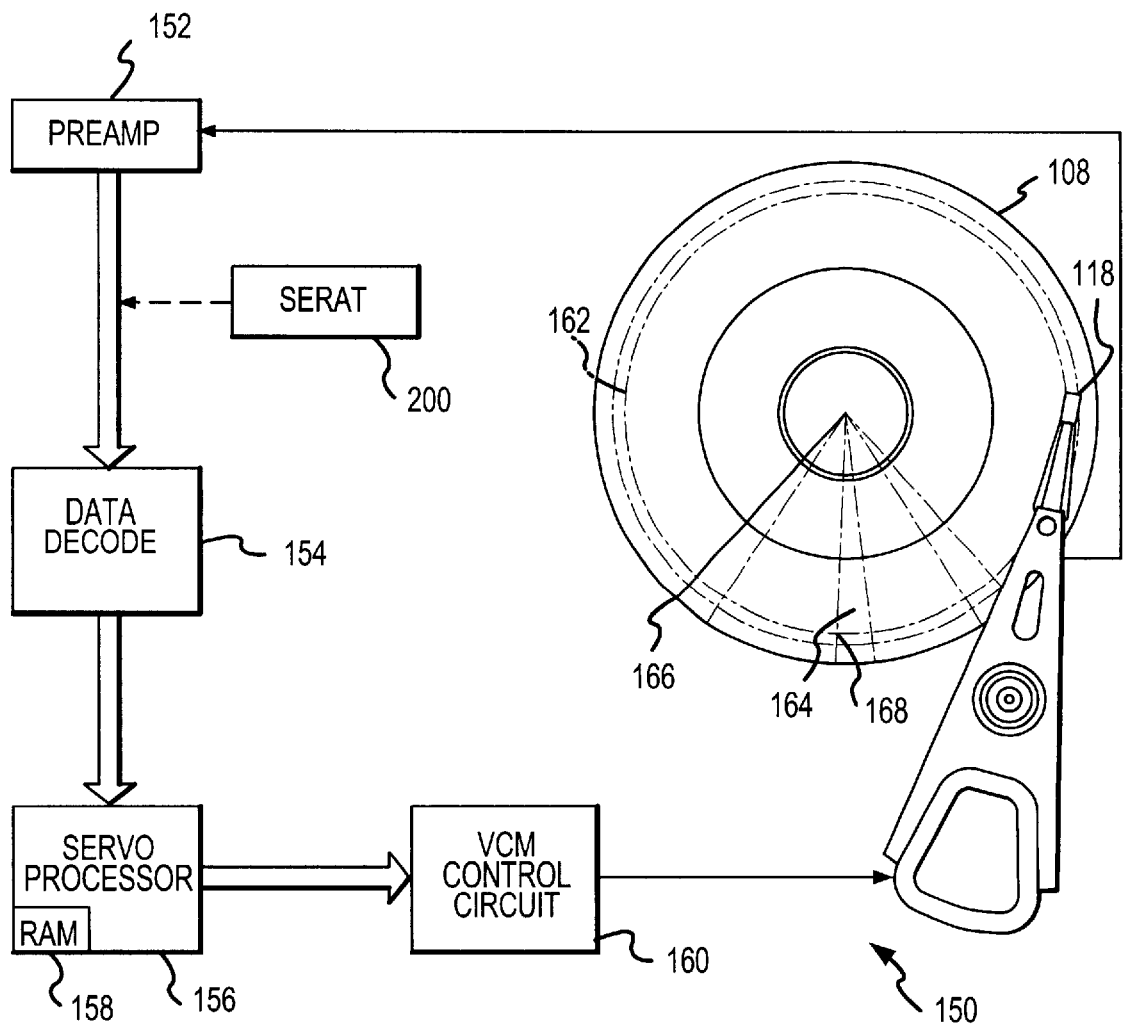
FIG. 2 is a simplified block diagram of an actuator control system for the disc drive of FIG. 1.

Referring to FIG. 2, a simplified block diagram of the actuator control circuit for the disc drive 100 (FIG. 1) is shown. The disc drive control circuit 150 includes a preamp circuit 152, a data decode circuit 154, a microprocessor 156 with associated RAM 158 and a VCM control circuit 160, all of which cooperate in a manner to be discussed below to control the position of the head 118. The disc 108 is divided into a plurality of concentric circular tracks 162. A one time revolution (INDEX) 166 around each track 162 is typically indicated be a mark that extends the radius of the disc 108. The disc 108 is also divided into a plurality of radial servo segments 164, also referred to as servo wedges. Thus, each track 162 will have spaced servo segments 164 with data sectors between the servo segments 164. The INDEX 166 end of each servo segment 164 on the rotational track 162 is typically referred to as a leading edge 168 of the servo segment 164. The INDEX 166 is found on the leading edge 168 of only one servo segment 164 on each track 162.

It will be recognized that servo control generally includes two main types of operation: seeking between tracks and track following. A seek operation entails moving a selected head 118 from an initial track 162 to a destination track 162 on the surface of the disc 108 through the initial acceleration of the head 118 away from the initial track 162 and subsequent deceleration towards the destination track 162. Once the head 118 is settled on the destination track 162, the disc drive control circuit 150 enters a track following mode of operation wherein the head 118 is caused to follow the destination track 162 until the next seek operation is to be performed. Such operations are well known in the art.

Figure 3:
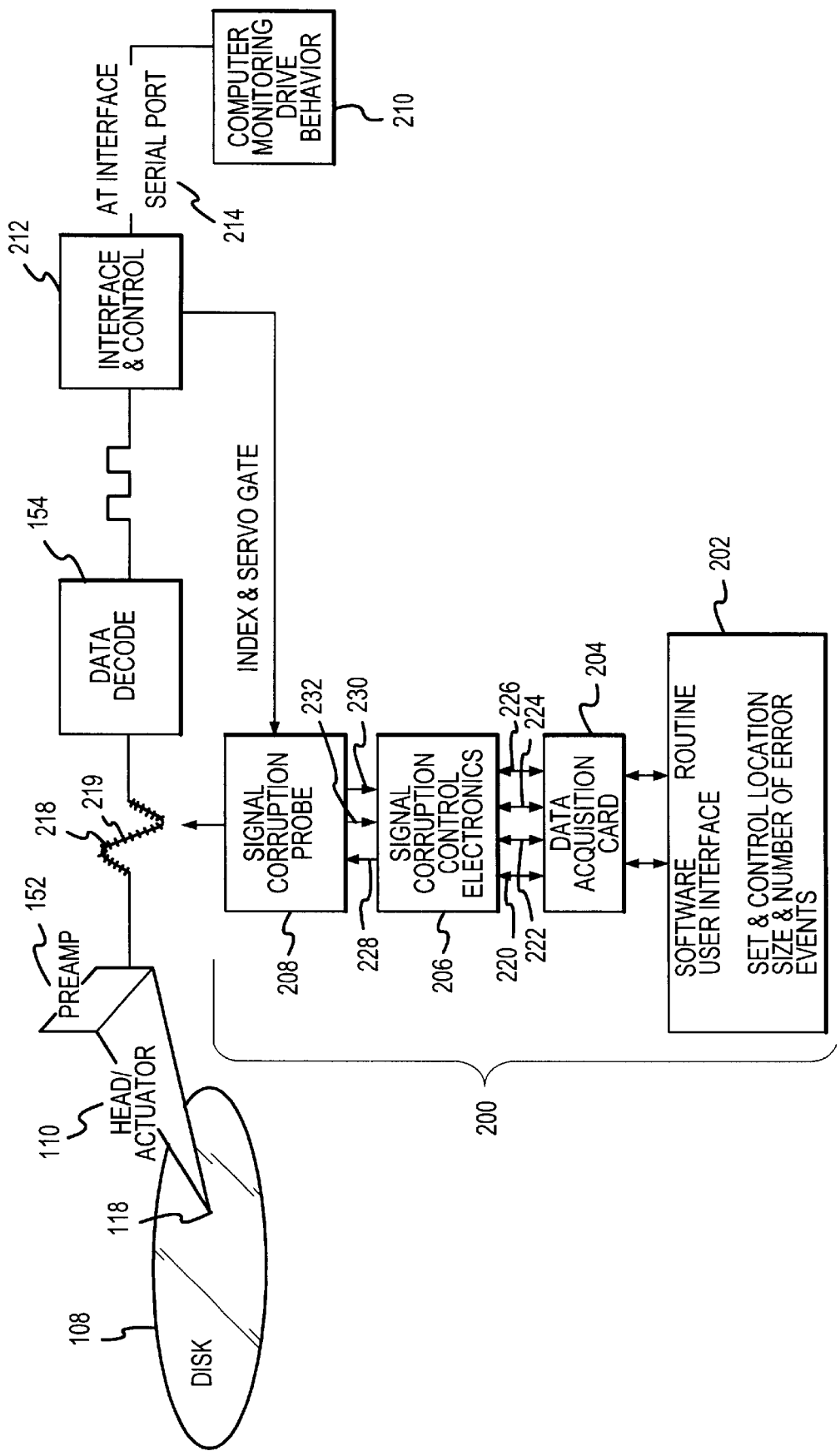
FIG. 3 is a block diagram of a preferred embodiment of the present invention shown connected to the read signal off of the preamplifier of the actuator control system shown in FIG. 2.

With continued reference to FIG. 2, analog servo burst signals are typically sensed by the head 118 at such time that servo information on the track 162 being followed passes under the head 118. The analog servo burst signals form a portion of a differential read signal 218 (FIG. 3). The differential read signal 218 is amplified by the preamp circuit 152 and provided to the data decode circuit 154. The data decode circuit 154 includes analog-to-digital converter (ADC) circuitry that converts the differential read signal 218 to digital form. It is at this point in the disc drive control circuit 150 that the software error recovery tool (SERAT) 200, in accordance with the present invention, is preferably inserted. The SERAT 200 is preferably used to disrupt the differential read signal 218 between the preamp circuit 152 and the data decode circuit 154 in the disc drive control circuit 150. The disruption of the differential read signal 218 is preferably timed to a point 219 (FIG. 3), or segment, in time on the differential read signal 218 corresponding to a specified servo segment 164 located on a track 162 of the disc 108 (FIG. 1). The disruption simulates the injection of an error event on the disc 108. The corrupted signal is fed to the data decode circuit 154 and the digitized disrupted signals are then provided to the microprocessor 156, which in the preferred embodiment is a digital signal processor (DSP).

Referring to FIG. 3, a block diagram of a SERAT 200 in accordance with a preferred embodiment of the present invention is illustrated in relation to its operation upon a disc drive 100 (FIG. 1). The SERAT 200 includes a software application 202 operating on a computer 210, a data acquisition card 204 for computer simulation, a timing and control circuit 206, which serves as the signal corruption control electronics, and a signal corruption probe 208. In accordance with a preferred embodiment of the present invention, the timing and control circuit 206 is also referred to as the controller. In FIG. 3, the SERAT 200 is shown applied to a disc drive 100 connected to a host computer system 210. The disc drive 100 has a disc 108, a head 118 and actuator assembly 110, a data decode circuit 154, an interface 212, a serial port 214, and the host computer system 210 has an ability to monitor the disc drive 100 behavior.

Figure 10:
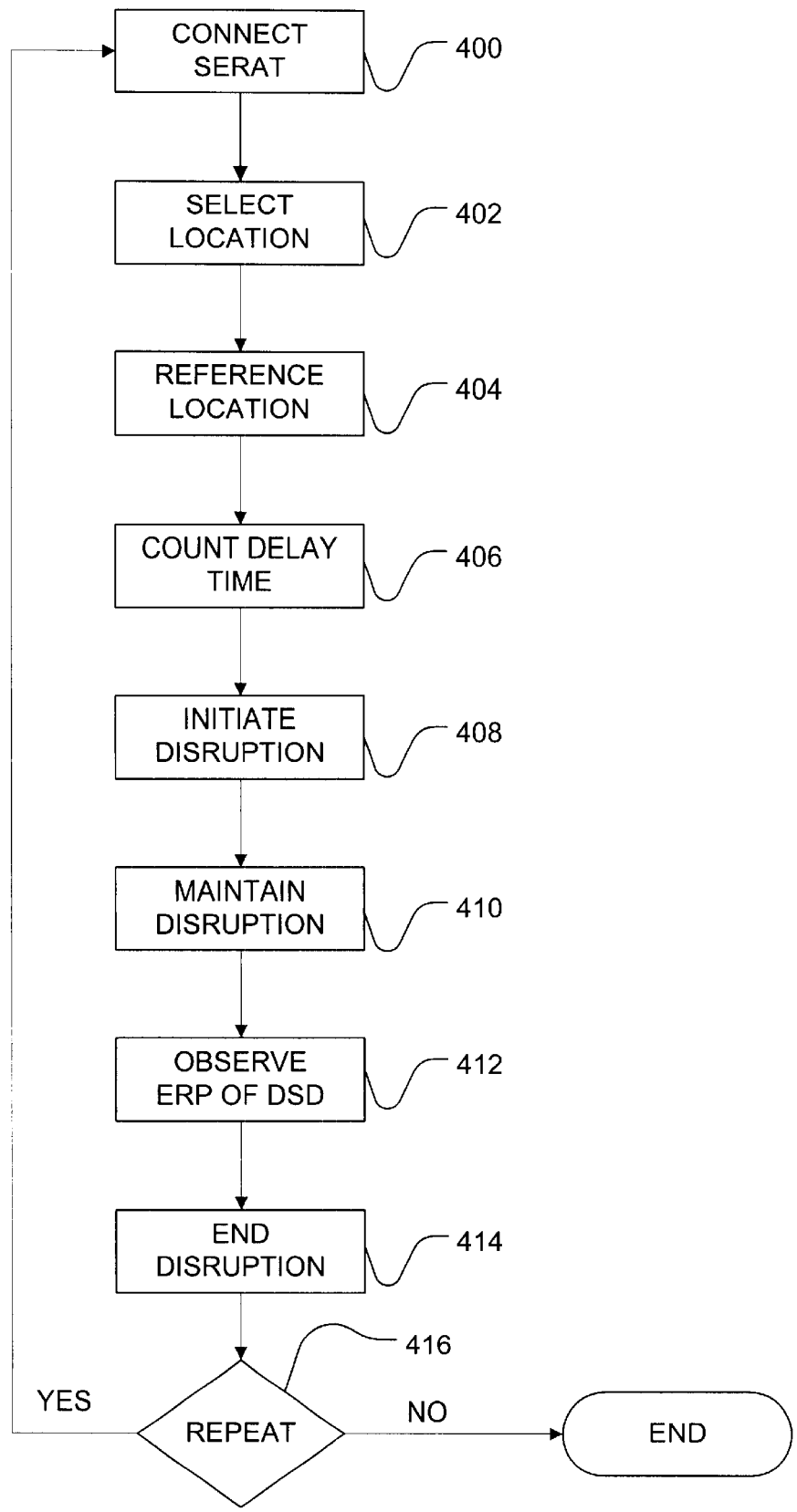
FIG. 10 is a flow diagram of the general operation of the present invention.

In a general sense, the error recovery procedure in the disc drive 100 is preferably initiated and monitored by the SERAT 200 in accordance with the flow diagram of FIG. 10. In operation 400, the SERAT 200 is preferably connected to the host computer system 210 and positioned across a differential read signal 218 prior to digitizing the signal 218 by the data decode circuit 154. It is crucial to the present invention that the SERAT 200 be applied to the signal 218 prior to error detection in the interface 212. In operation 402, the user of the SERAT 200 selects a location within the servo wedge 164 data stream of the data storage device 100 to which the error event is to be simulated. In a preferred embodiment, this location will be defined as a particular servo segment 164 on a particular track 162 of a disc drive 100. In operation 404, and in accordance with a preferred embodiment, the SERAT 200 references the location 164 by a segment 219 on the differential read signal 218. The segment 219 is representative of the information stored on the particular servo segment 164 specified by the user in operation 402. In operation 406, the SERAT 200 counts a delay time from the segment 219. The delay time is representative of a physical distance from the servo segment 164 leading edge. The delay time positions the disruption to the exact point in the servo wedge 164 data stream, as specified to the user.

Figure 8:
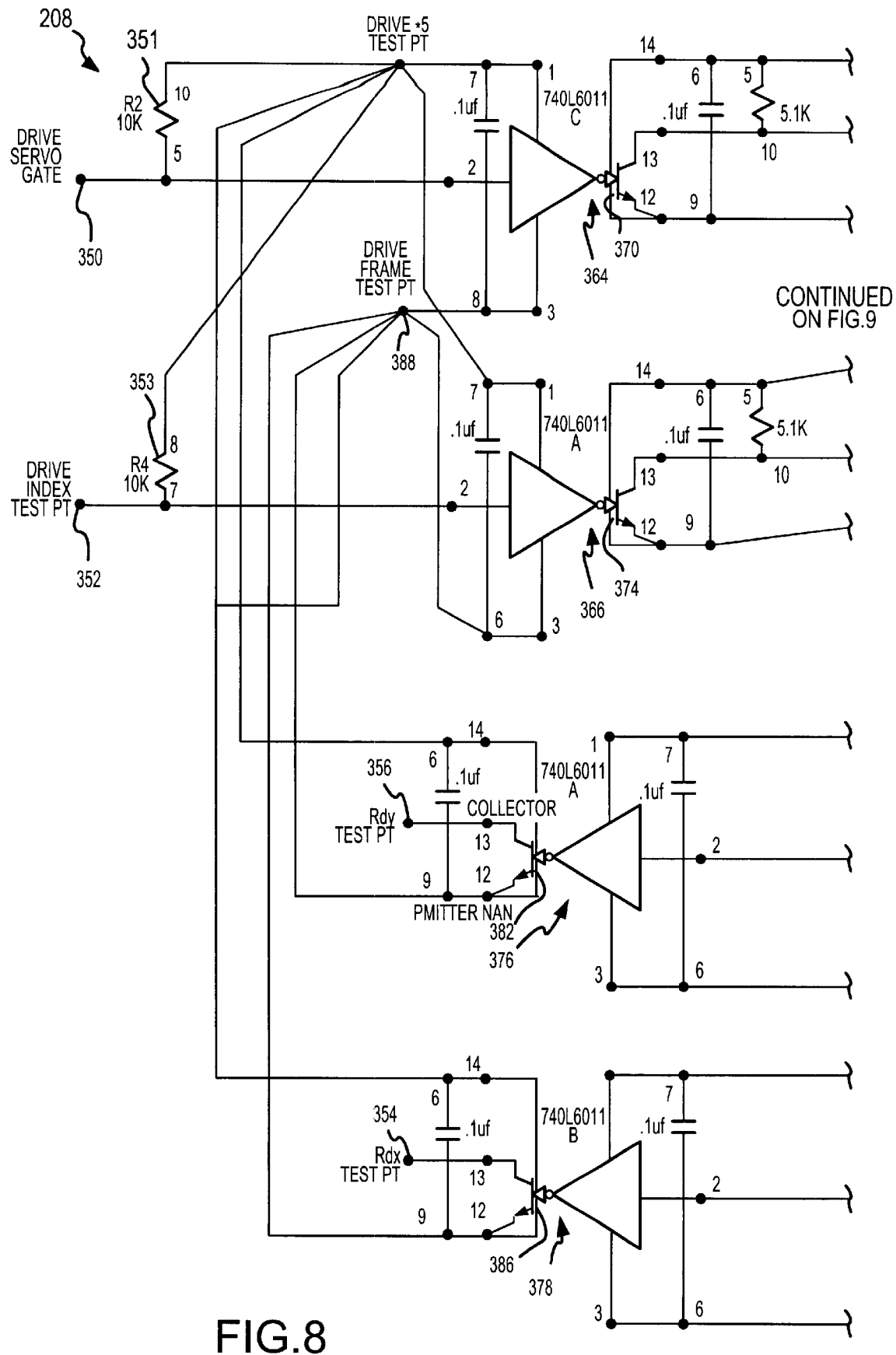
FIG. 8 and FIG. 9 is an exemplary schematic diagram of the signal corruption probe circuit in accordance with a preferred embodiment of the present invention.

In operation 408, the SERAT begins the actual corruption of the differential read signal 218 by disrupting both channels ($R_{dx}$ and $R_{dy}$) of the signal 218. The disruption is implemented by shorting both channels to DC common 388 (FIG. 8). In operation 410, the disruption is maintained by the SERAT 200 for a duration specified to the software application 202 by the user. In operation 412, the reactions by the error recovery procedures in the disc drive 100 in response to the simulated error event are observed through the user-interfaced software application 202. Observing such responses allows the user to determine whether the error recovery procedures are designed properly. In operation 414, the disruption is terminated. In operation 416, the SERAT 200 allows the user to repeat the process. If the user requests another test, then operation 402 is initiated and the process is repeated.

Referring again to FIG. 3, the operation of the SERAT 200 is designed around the injection of an error event into the differential read signal 218 by the signal corruption probe 208. The injection of an error event onto a particular point 219, or segment, in time on the differential read signal 218 simulates an error at a particular position on the disc 108, thus triggering operation of the routines internal to the error recovery procedure embedded in the disc drive 100 control firmware of the interface 212. In turn, the error recovery procedure supplies instructions to the disc drive control circuit 150. Such instructions are designed to ensure that the disc drive control circuit 150 overcomes the effects of any possible error events in the disc drive 100. Overall control over the placement of the simulated error event and the response of the error recovery procedure are monitored on the computer 210 using the software application 202, which has a graphical and interactive environment for measurement and automation. By monitoring how the error recovery procedure responds to a predetermined error, disc drive designers can predict whether or not the routines of the error recovery procedure will function properly in a commercial setting.

The software application 202, which is administered in the preferred embodiment by LabView (manufactured by National Instruments), provides for functional, user-interfaced control of the SERAT 200. The data acquisition card 204 allows for digital control of the controller 206 by the software application 202. In the preferred embodiment, the data acquisition card 204 is a PCI 1200 data acquisition board manufactured by National Instruments. The controller 206 is responsible for controlling the operation of the signal corruption probe 208.

The signal corruption probe 208 applies a disruption to the differential read signal 218 at the point of insertion. The signal corruption probe 208 disrupts the differential read signal 218 by effectively canceling both channels ($R_{dx}$ and $R_{dy}$) of the signal 218. In a preferred embodiment, the disruption is accomplished by shorting both channels to DC common 388 (FIG. 8). The disruption, applied between preamp 152 and data decode circuit 154, simulates an error event on the disc 108.

The overall operation of the SERAT 200 requires linked communication between the software application 202 operated by the computer 210 and the controller 206 via the data acquisition card 204, and linked communication between the controller 206 and the signal corruption probe 208. Digital I/O lines PA(0) 220, PA(6) 222, PB(0) 224, and PB(1) 226 provide a communication link between the components of the SERAT 200 in order to control and monitor the status or result of the signal corruption by the SERAT 200 and its effect upon the error recovery procedure in the disc drive 100.

The digital I/O lines 220, 222, 224, and 226, all route between the data acquisition card 204 and the controller 206 in order to afford digital communication between the software application 202 and the controller 206 for the signal corruption probe 208. In general, the digital I/O lines 220, 222, 224, and 226 set or report the conditions for the state machines 250, 266, and 272 (FIG. 4) resident in the controller 206. In particular, Digital I/O line 220 serves as the error event injection line and is referred to as the "error enable line." When the error enable line 220 is enabled (PA (0)=1), the controller 206 is enabled to activate the SERAT KILL signal control line 228 to develop and deliver an error event at a precisely specified time and for a precisely specified period of time. The SERAT KILL signal control line 228 activates the corruption capabilities of the signal corruption probe 208, thus disrupting the differential read signal 218. The SERAT KILL signal control line 228 is a result of the parameters set with: the digital I/O lines 220, 222, 224, and 226; the counter output line states of counters 250, 266, and 272; the values set in the counters 250, 266, and 272; the drive INDEX probe 352 (FIG. 8); and the output the op-amp 295 (FIG. 5), if the analog timing circuit 280 is applicable. In short, for disruption of the read signal 218 to occur, both the error enable line 220 and the SERAT KILL signal control line 228 must be enabled.

There are two control lines emanating from the probe 208 and terminating at the controller 206. SERVO GATE control line 230 and INDEX control line 232 are optically isolated index 166 and servo gate 164 signals gathered from the disc drive 100. The SERVO GATE control line 230 communicates a pulse each time that the transducer 118 passes over the leading edge 168 of a servo segment 164. The signal communicated through SERVO GATE control line 230 is supplied from the probe 208 out of a servo gate port 358 (FIG. 8), which was supplied the signal from an optically isolated drive servo gate probe 350 (FIG. 8). The INDEX control line 232 communicates a pulse each time that the transducer 118 passes over the INDEX 166 mark of the disc 108. The signal communicated through the INDEX control line 232 is supplied from the probe 208 out of the index port 360 (FIG. 9), which was supplied the signal from an optically isolated drive INDEX probe 352 (FIG. 8).

Digital I/O line 222 manages which function is to be used to maintain the disruption on the differential read signal 218. If the digital I\O line 222 is active (PA (6)=1), then an analog timing circuit 280 (FIG. 5) is used to maintain the disruption of the differential read signal 218. If the digital I\O line 222 is disabled (PA (6)=0), a duration counter 272 (FIG. 4) is used to maintain the disruption of the differential read signal 218. Digital line 224 and digital line 226 serve as hardware status indicators to the software application 202 of the performance of the SERAT 200. Both lines 224 and 226 are reset with every INDEX 166 pulse. Table 1 best explains the operation, or state, of the data lines:

TABLE 1

| PB (0) | PB (1) | Status |
|---|---|---|
| 0 | 0 | There has been no error insertion simulation since the last INDEX. |
| 0 | 1 | The error insertion simulation occurred, but the error was not applied. |
| 1 | 0 | Not allowed = invalid status |
| 1 | 1 | The error insertion simulation occurred and the error was applied. |

Figure 4:
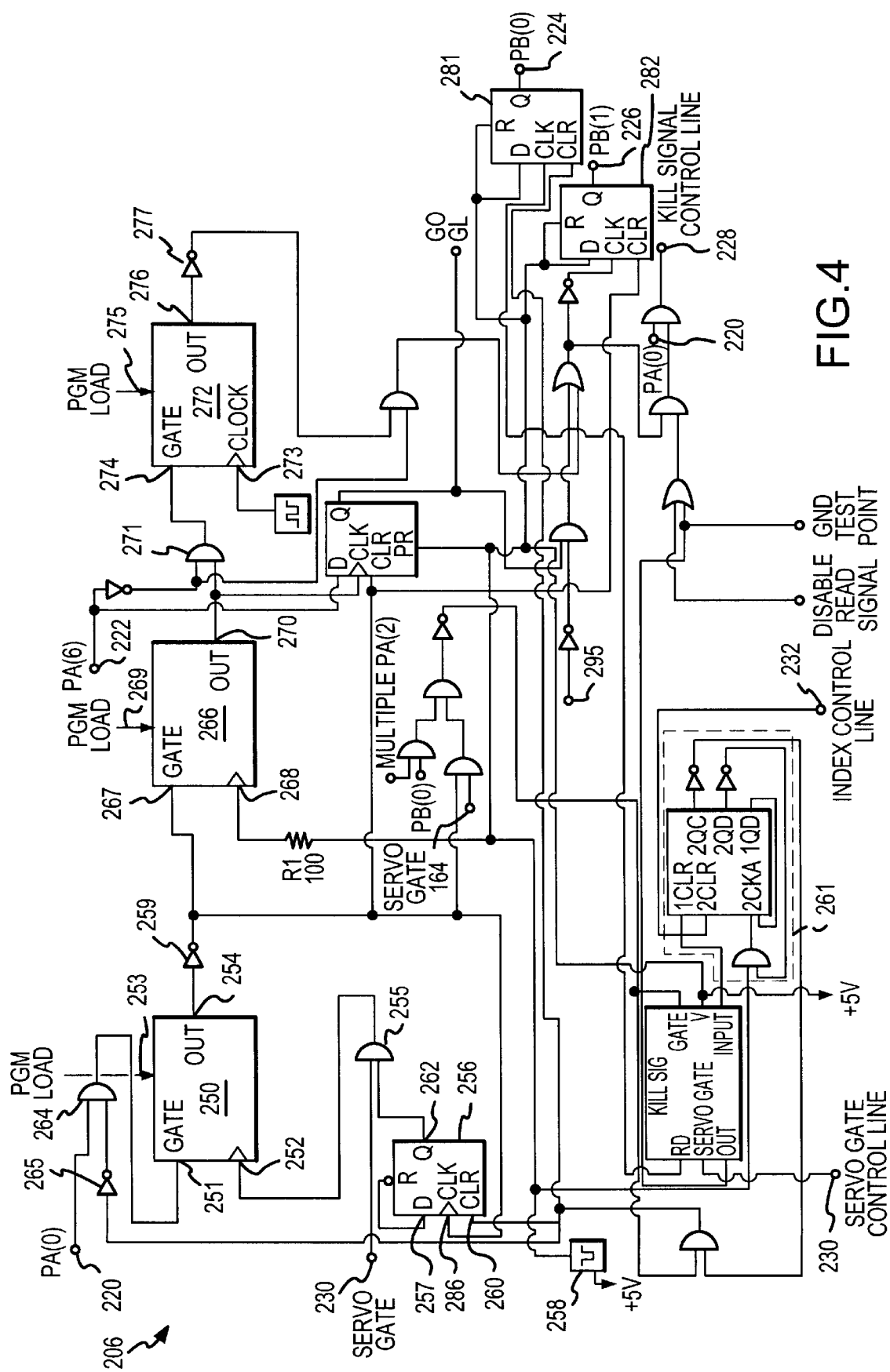
FIG. 4 is a schematic diagram of the timing and control circuitry in the SERAT in accordance with a preferred embodiment of the present invention.

Referring to FIG. 4, a schematic circuit diagram illustrating a timing and control circuit 206 in accordance with a preferred embodiment of the present invention is shown. The three main components of the controller 206 are a servo gate counter (B1) 250, a delay counter (B2) 266, and a duration counter (B0) 272. The servo gate counter 250 is used to identify the particular servo segment 164 on a particular track where an error is to be simulated. In a preferred embodiment, counter 250 has three inputs—a gate input 251, a clock input 252, and a program input 253—and one output 254. The clock 252 of counter 250 is controlled through a logic gate 255 by the servo gate control line 230 and a D Flip-Flop 256. The Flip-Flop 256 has a D input 257 railed to a +5 V power source, a clock input 286 connected to the output of an inverter 259, which is tied to the output 254 of the counter 250, and a clear input 260 connected to an index pulse stretching circuit 261 monitoring the disc drive 100 detection of the INDEX 166 mark as it passes under the transducer 118. The clear input 260 communicates a signal to the Flip-Flop 256 each time that the transducer 118 passes over the INDEX 166 of the disc 108. The Flip-Flop 256 disables the clock input 252 into the counter 250 after the leading edge 168 of the target servo segment 164 is detected. The Flip-Flop 256 will hold the clock input 252 disabled until the next pulse is communicated from the clear input 260, thus signaling another INDEX 166 has been detected.

Assuming the gate input 252 is not disabled by the Flip-Flop 256, each time the transducer 118 passes over a leading edge 168 of a servo segment 164, the state of the output of the logic gate 255 goes high and a pulse is sent to the counter 250. When the number of pulses into the clock input 252 equals the value of the counter 250, as set by the software application 202 through the program input 253, the counter output 254 changes state. The state of the output 254 is normally high. Upon a state change to low, the state of the output of inverter 259 is triggered high.

Although the Flip-Flop 256 initializes the counter 250 once the transducer 118 recognizes the INDEX 166 mark, the counter 250 is not activated until the state of the output of the logic gate 264 goes high. The gate input 251 is controlled through the logic gate 264 by the error enable line 220 and the index pulse stretching circuit 261. The state of the output of the logic gate 264 is high when the error enable line 220 is enabled (PA (0)=1) and the state of the output of the inverter 265 is high. The index pulse stretching circuit 261 controls the state of the inverter 265. When the transducer 118 passes over the INDEX 166 mark, the state of the output of the index pulse stretching circuit 261 goes low. The change in state triggers the state of the output of the inverter 265 high, thus changing the state of the output of the logic gate 264 from low to high, so long as the error enable line 220 is enabled (PA (0)=1). Under such circumstances, a pulse is sent from the logic gate 264 to the gate input 251. The pulse activates the counter 250. Upon detection of the INDEX 166 mark, the state of the output of the inverter 265 is only high for the immediate pulse identifying the INDEX 166 mark. Otherwise, the state of the output of the inverter 265 remains low. Once the counter 250 is; activated, it begins counting according to the servo gate pulse 230 through the clock 252, as discussed above.

As mentioned, once the counter 250 completes counting (state of the output 254 goes low), the state of the output of the inverter 259 goes high. Upon this state change, the counter 266 is activated. In a preferred embodiment, the counter 266 is a delay counter and has three inputs—a gate input 267, a clock input 268, and a program input 269—and one output 270. The delay time is determined according to the following formula:

Delay Time (B2 Count Initialization)=$D\%$*Servo Segment Time/ 125 nanoseconds

Servo Segment Time (SST) is defined by the formula:

$SST$=60/[(drive $RPM$)*(# servo segments per track)]

$D\%$ is the relative position within the servo segment 164 where the error event is to be simulated. Hence, the value of the counter 266 is stored once the user specifies to the software application 202 the physical distance within servo segment 164 that the error event simulation is to occur.

In a preferred embodiment, an oscillator 258, supplying a 5 MHZ square wave, controls the clock 268. The counter 266 begins counting the delay once the state of the output of the inverter 259, which is directly connected to the gate input 267, goes high. As mentioned, the state of the output of the inverter 259 goes high upon completion of the counting by the counter 250. Upon such condition, the counter 266 is activated and counts n times 125 nanoseconds, where n is a value loaded into the program input 269 by the software application 202. The state of the output 270 is normally high. When the state of the output of the inverter 259, which is directly coupled to the gate input 267, goes high, the state of the output 270 goes low and remains low for n times 125 nanoseconds. At the termination of this time period, the state of the output 270 goes high and is fed into the logic gate 271.

Once the counter 266 completes counting and the error enable line 220 is active (PA (0)=1), one of two functions that initiate and control the duration of the error injection event is activated. If the duration of the error event is to be greater than 1 microsecond, a duration counter 272 is implemented. If the duration of the error event is to be less than 1 microsecond, then an analog timing circuit 280 (FIG. 5) is implemented.

In instances mandating the use of the counter 272, the software application 202 sets the digital 110 line 222 low (PA (6)=0) and the counter 272 to a specified number (n) defined by:

$n$=Event Time/500; where Event Time is the desired duration in nanoseconds

In a preferred embodiment, the counter 272 is a duration counter used in controlling the duration of the signal corruption procedure. The counter 272 preferably has three inputs—a clock input 273, a gate input 274, and a program input 275—and one output 276. When the state of the output 276, which is normally high, goes low, the state of the output of the inverter 277 goes high. Once the state of the output of the inverter 277 is triggered high, the SERAT KILL signal control line 228 is enabled. The state change of the counter 272 can only be realized when the digital I/O line 222 is low (PA (6)=0) and the state of the output 270 of the counter 266 is high. Under such circumstances, the state of the output of the logic gate 271 is triggered high. When the state of the output of the logic gate 271, which is directly connected to the gate input 274, goes high, the state of the output 276 goes low. The counter 272 remains low for n nanoseconds, as set by the application module 202 through the program input 275. The period is timed by the clock input 273, which is coupled to a 2 MHZ clock with a 500-nanosecond period. The 2 MHZ clock is located internally to the data acquisition card 204. At the conclusion of n nanoseconds, the state of the output 276 goes high, thus triggering the state of the output of the inverter 277 low. The SERAT KILL signal control line 228 is disabled when the state of the output of the inverter 277 goes low. Thus, the disruption of the differential read signal 218 is terminated.

Figure 5:
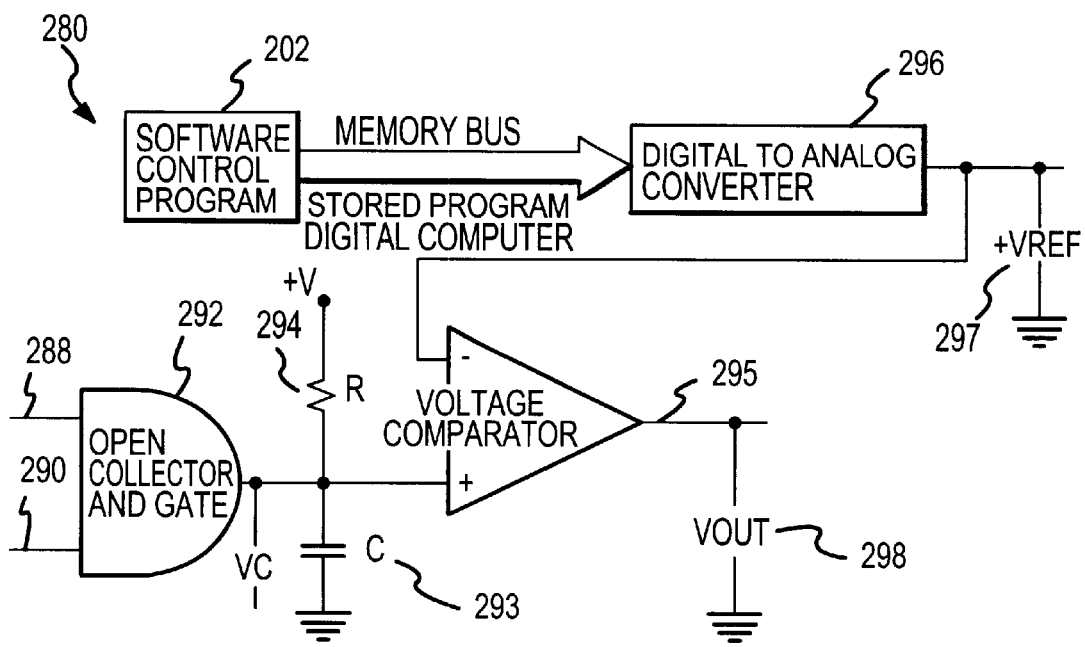
FIG. 5 is a schematic diagram of an analog timing circuit to be used as an alternate to the duration counter in FIG. 4.

In instances mandating the use of the analog circuit timing 280, reference should be made to FIG. 5. FIG. 5 depicts a simplified schematic diagram of an analog timing circuit 280 in accordance with a preferred embodiment of the circuit as incorporated into the SERAT 200. The analog timing circuit 280 is to be used as an alternate to the counter 272 in FIG. 4 when the user directs the software application 202 to maintain the disruption of the differential read signal 218 for a period greater than 50 nanoseconds and less than 1 microsecond. In a preferred embodiment, the circuit includes a 2-input logic gate 292, a capacitor 293, a resistor 294, and an operational amplifier 295 used as a voltage comparator. One input 288 to the logic gate 292 is directly connected to the output of the counter 266, while the other input 290 is directly connected to the digital I/O line 222. The output of the op-amp 295 is connected to the controller 206 at the exact same connection point as the output of the counter 272. The analog timing circuit 280 is controlled by the voltage ($V_{ref}$) 297 of the output from a digital-to-analog converter (DAC1) 296.

When the software application 202 sets the digital I/O line 222 high (PA (6)=1), the counter 260 is disabled and the state of the input 288 goes high. By setting the digital I/O line 222 high, the software application 202 has disabled the duration counter 272 since the digital I/O line 222 is inverted prior to being fed into the logic gate 271, thus forcing the state of the output of the logic gate 271 low. Once the counter 266 completes counting, the state of the input 290 goes high. When both inputs 288 and 290 are high, the capacitor 293 begins to charge through the resistor 294. When the capacitor 293 voltage ($V_c$) exceeds +$V_{ref}$, the op-amp 295 rails high and its output, $V_{out}$ 298, is near the logic level supply voltage, V (typically +5 Volts). The duration of the error injection event is defined by setting $V_{ref}$ 297 between the values of 0.43 and 3.486 Volts, with a voltage of 0.43 Volts corresponding to the minimum duration of 50 nanoseconds and 3.486 Volts corresponding to a duration of 1 microsecond. The voltage setting of $V_{ref}$ is preferably determined by the following equation:

$$V_{ref} = 5.43 - 5e^{-0.00105[t-50]} \text{ where } t \text{ is in nanoseconds}$$

Figure 6:
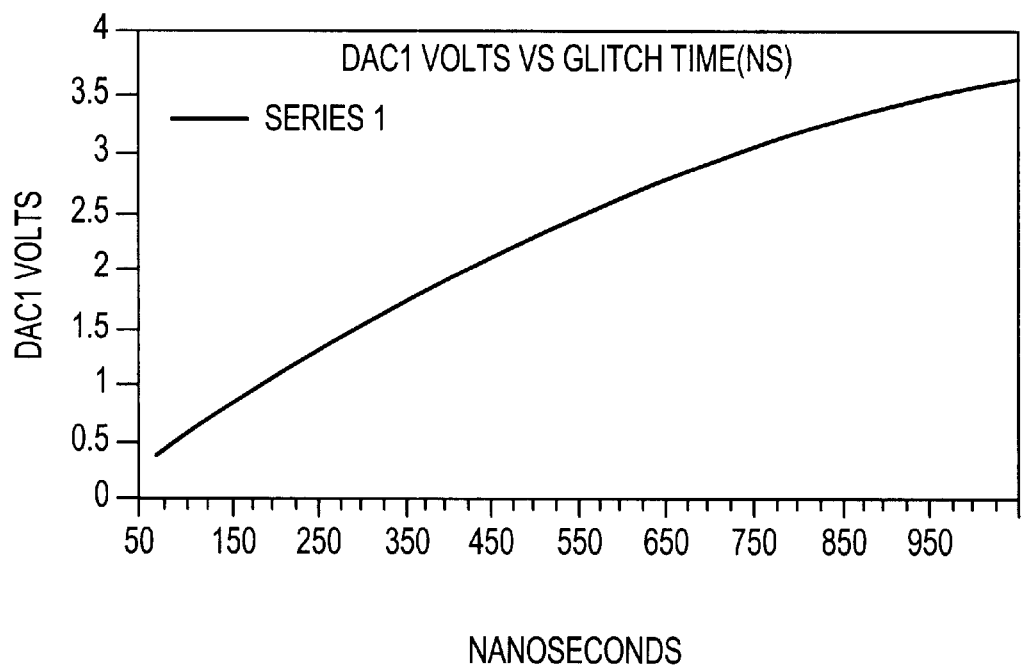
FIG. 6 is a graph of the digital-to-analog converter (DAC) voltage versus a time period as used to control the analog timing circuit in FIG. 5.

FIG. 6 shows a plot of the above function with the range of voltages corresponding to the duration of the error injection event. Once the analog timing circuit 280 completes counting, it will effectively shift the error enable line 220 from enabled (1) to disabled (0), thus terminating the error injection event.

Referring back to FIG. 4, the controller includes the flip-flops 281 and 282 as hardware status indicators to the software application 202. The inputs to Flip-Flops 281 and 282 are coupled, through logic circuits, to the output 270 of the counter 266, to the output of the inverter 277, and to the output 295 of the analog timing circuit 280. The Flip-Flops 281 and 282 are responsible for triggering the states of digital I/O lines 224 and 226, respectively. An illustration of these status lines is illustrated above in Table 1.

Figure 7:
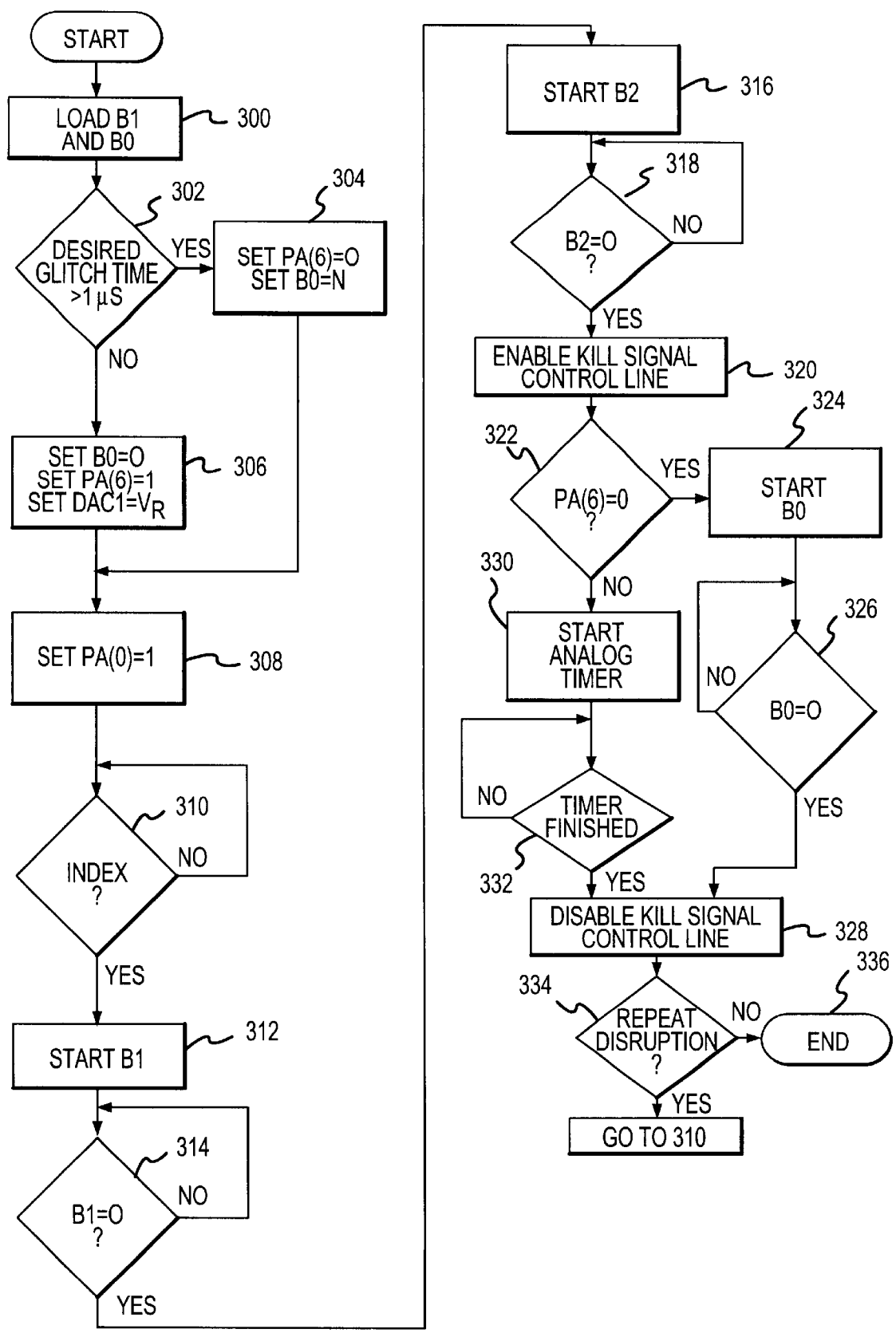
FIG. 7 is an operational flowchart of the timing and control circuitry of FIG. 4.

Referring to FIG. 7, a flow diagram is shown which describes the operation of the timing and control routine resident in the controller 206, in accordance with a preferred embodiment of the present invention. It should be recalled that the overall operation of the present invention requires linked communication between the software application 202 and the controller 206 via the data acquisition card 204 and linked communication between the controller 206 and the signal corruption probe 208. Further, the software application 202 is programmed to allow for fixed, random, or sequential placement of the error event on consecutive rotations of the disc 108.

In operation 300, the software application 202 sets the counters 250 and 266 in response 30 to values specified to the software application 202 by a user. The loading of the values of the counters 250 and 266 must be set prior to the error enable line 220 going active (PA (0)=1). Operation 300 begins once a start request is sent to the software application 202 from a user. In operation 302, the software application 202 sets the duration of the error injection event (glitch time) in response to a glitch time specified by the user. If the user sets the glitch time to a duration greater than 1 microsecond, then, in operation 304, the software application 202 disables the digital I/O line 222 (PA (6)=0) and sets the counter 272 to n (discussed above). However, if the software application 202, in operation 302, sets the duration of the glitch time to a duration less than 1 microsecond, then, in operation 306, the software application 202 sets the counter 272 low (B0=0) and enables the digital I/O line 222 (PA (6)=1). These parameters activate the analog timing circuit 280 once the counter 266 completes counting, in operation 318. The software application 202, in operation 306, also sets the $V_{ref}$ 297 to a value between 0.43 and 3.486 Volts corresponding to the relative glitch time desired.

Once the counters are set, the timing and control routine is activated in operation 308 by enabling the digital I/O line 220 (PA (0)=1). When the error enable line 220 is enabled (PA (0)=1), the controller 206 is activated. Operation 310 is designed to hold off the timing and control routine of the controller 206 until the INDEX 166 is referenced by the servo gate pulse probe 350. In operation 312, the counter 250 is initiated. The counter 250, which has a value that is preloaded by the software application 202, is maintained by the servo gate control line 230, which serves as the clock 252 to the counter 250. For example, if the counter were set at 4, then, once initiated, it would count from 4 to zero each time the leading edge 168 of a servo segment 164 passes under the transducer 118. Once the counter 250 has reached zero, as determined in operation 314, the delay counter 266 immediately starts counting pursuant to operation 316. Once the counter 266 has completed counting, as determined in operation 318, the SERAT KILL signal control line 228 is enabled pursuant to operation 320. By activating the SERAT KILL signal control line 228, the SERAT 200 has begun disruption of the differential read signal 218.

The duration of the disruption is then determined by two exclusive functions. If the digital I/O line 222 is disabled (PA (6)=0), operation 322 activates the counter 272 pursuant to operation 324. Once the counter 272 has reached zero, as determined in operation 326, the SERAT KILL signal control line 228 is disabled pursuant to operation 328, thus terminating the disruption procedure. Alternatively, if the digital I/O line 222 is enabled (PA (6)=1), as determined by operation 322, the analog timing circuit 280 is activated pursuant to operation 330. Once the analog timing circuit 280 is finished counting, as determined in operation 332, the SERAT KILL signal control line 228 is disabled pursuant to operation 328, thus terminating the disruption procedure.

When the data storage device being tested by the SERAT is a disc drive 100, as in a preferred embodiment, the software application allows for fixed, random, or sequential placement of the error event on consecutive rotations of the disc 108 In operation 334, the software application 202 determines whether the user has requested that the error event be repeated on consecutive rotations of the disc 108. If there was no such request, then, in operation 336, the routine is completed and the software application 202 awaits a start request by the user, via the host 210, from which step 300 will be initiated. If the user requests that the error event be repeated on consecutive rotations, as determined by operation 334, then the timing and control routine is re-initiated at operation 310.

Figure 9:
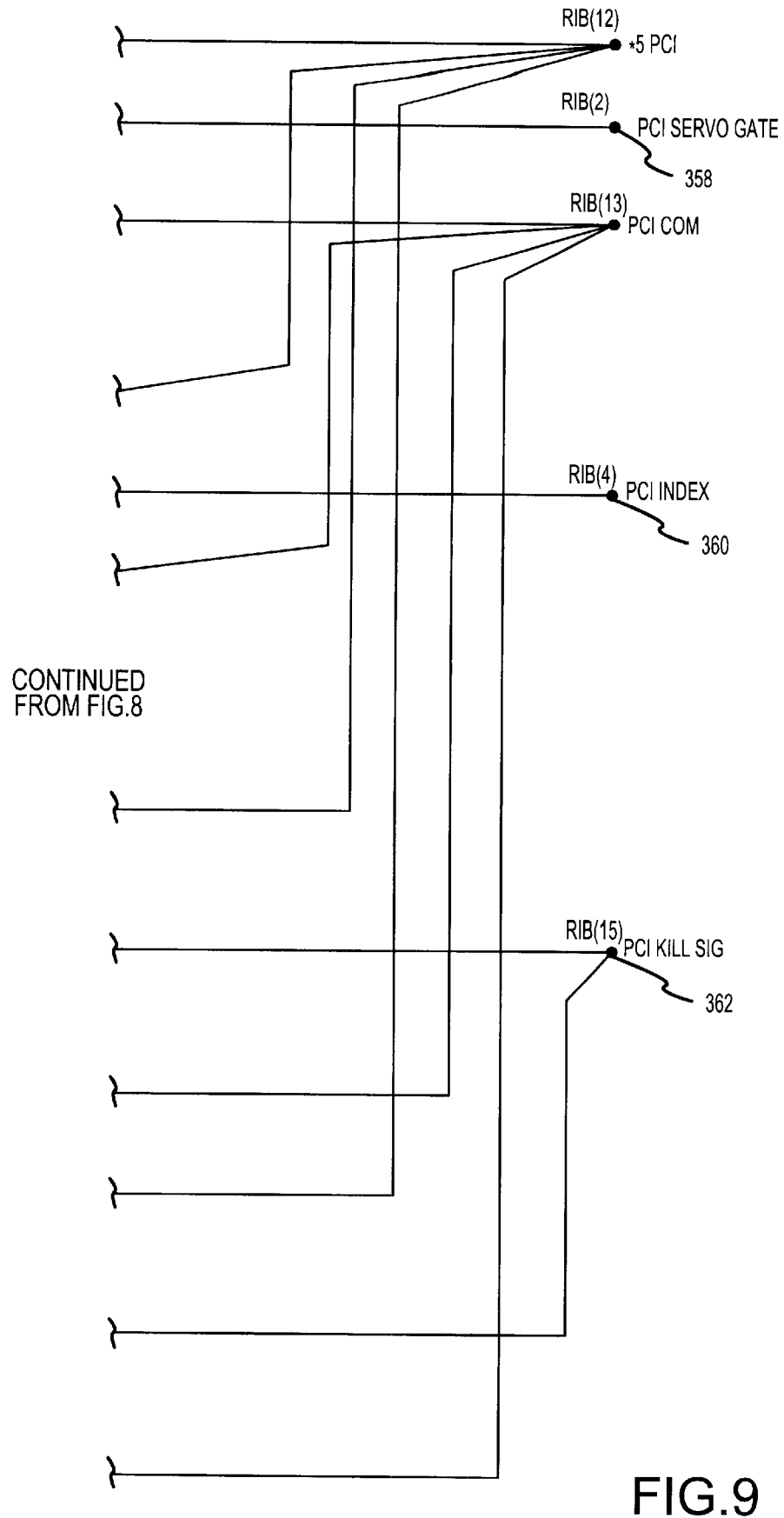

Referring to FIG. 8 and FIG. 9, a circuit drawing of the signal corruption probe 208 is shown in accordance with a preferred embodiment of the present invention. The signal corruption probe 208 implements the disruption to the differential read signal 218. With the exception of a drive servo gate probe 350, a drive INDEX probe 352, an $R_{dy}$ test point 354, and an $R_{dx}$ test point 356, the signal corruption probe 208 is optically isolated from the disc drive 100 electronics.

A servo gate port 358, a index port 360, a servo gate optical isolator 364, and an index optical isolator 366 serve as the communication connection to the PCI data acquisition card 204. The connection to the data acquisition card 204 communicates the positions of the transducer 118 over the disc 108, as supplied by the servo gate probe 350 and the drive INDEX probe 352.

With reference to the detection of servo segments 164 by the signal corruption probe 208, each instance that the transducer 118 passes over a leading edge 168 of a servo segment 164 a signal is generated through the drive servo gate probe 350. The drive servo gate signal through the drive servo gate probe 350 activates the phototransistor 370. Activation of the phototransistor 370 changes the impedance of the phototransistor 370 from high impedance to low impedance, thus allowing a current to the servo gate port 358. The servo gate port 358 serves as a communication port to the controller 206 signaling that the transducer 118 has detected a leading edge 168 of a servo segment 164. Such a response by the transducer 118 is detected by the drive servo gate probe 350 and communicated through the servo gate port 358 as discussed above. The servo gate port 358 communicates the pulse to the controller 206 through the servo gate control line 230. This information is used in accordance with earlier illustrations involving counters in FIG. 4 and FIG. 7. In a preferred embodiment, it is important to the operation of the SERAT 200 that the only electrical connection between the servo gate port 358 and the electronics of the disc drive 100 is with an optically isolated drive servo gate probe 350.

With reference to the detection of the INDEX 166 by the signal corruption probe 208, each instance that the transducer 118 passes over the INDEX 166 of a particular track 162 a signal is generated through the drive index probe 352. The drive index signal through the drive index probe 352 activates the phototransistor 374. Activation of the phototransistor 374 changes the impedance of the phototransistor 374 from high impedance to low impedance, thus allowing a current to the index port 360. The index port 360 serves as a communication port to the controller 206 signaling that the transducer 118 has detected the INDEX 166 of a particular track 162. Such a response by the transducer 118 is detected by the drive index probe 352 and communicated through the index port 360 as discussed above. The index port 360 communicates the pulse to the controller 206 through the INDEX control line 232. This information is used in accordance with earlier illustrations involving counters in FIG. 4 and FIG. 7. In a preferred embodiment, it is important to the operation of the SERAT 200 that the only electrical connection between the index port 360 and the electronics of the disc drive 100 is with an optically isolated drive index probe 352.

In a preferred embodiment, the $R_{dx}$ test point 354 and the $R_{dy}$ test point 356, under control of the kill signal port 362, administer the actual disruption of the differential read channel 218. The kill signal port 362 serves as the communication connection between the controller 206 and the differential read signal 218. Once the controller 208 enables the SERAT KILL signal control line 228, in accordance with earlier illustrations involving counters in FIG. 4, FIG. 5, and FIG. 7, a current is supplied through the kill signal port 362 to optical isolators A 376 and B 378. In a preferred embodiment, it is important to the operation of the SERAT 200 that the only electrical connection between the kill signal port 362 and the differential read signal 218 is with the optically isolated test points 354 and 356.

The SERAT KILL signal control line 228 on kill signal port 362 is coupled via optical means to the phototransistor 382. Activation of the phototransistor 382 changes the impedance of the phototransistor 382 from high impedance to low impedance, thus shorting the $R_{dy}$ test point 356, which is connected across a channel of the differential read signal 218, to DC common 388. In a preferred embodiment, DC common 388 is a connection of the probe 208 to the metal casing of the disc drive 100.

Likewise, the SERAT KILL signal control line 228 on kill signal port 362 is coupled via optical means to the phototransistor 386. Activation of the phototransistor 386 changes the impedance of the phototransistor 386 from high impedance to low impedance, thus shorting the $R_{dx}$ test point 354, which is connected across the other channel of the differential read signal 218, to DC common 388. In a preferred embodiment, DC common 388 is a connection of the probe 208 to the metal casing of the disc drive 100.

The SERAT finds utility when used with any type of data storage device delivering a differential read signal and having an error recovery procedure. The differential read signal is disrupted by a signal corruption probe that effectively cancels the signal for a predetermined duration. This cancellation simulates an error event in the data storage device, thus, providing an opportunity to monitor the ability of the storage device to recover from the error condition. In a preferred embodiment, the SERAT is employed to a disc drive.

In summary, the present invention may be viewed as a method (such as in operations 400 through 416) of initiating an error recovery procedure in a data storage device (such as 100) having a recordable medium (such as 108) containing servo position information and delivering a read signal (such as 218) via a transducer (such as 118) to an interface and control logic portion (such as 212) of the data storage device (such as 100). The method (such as in operations 408, 410, and 414) corrupts a read signal (such as 218) from the transducer (such as 118) for a predetermined period of time (such as in operation 410). The disruption simulates an error event in the data storage device (such as 100). The method (such as in operation 412) also observes operation of the data storage device (such as 100) to ascertain the ability of the error recovery procedure to deal with the error event.

The read signal corrupted is preferably a differential read signal (such as 218) defined as segments (such as 219) along a time axis. Each segment (such as 219) is representative of information stored on a section (such as 162) of the recordable medium (such as 108). In order to corrupt the read signal (such as 218), the method (such as in operation 402) initially selects a location (such as 164) on the section (such as 162) of the recordable medium (such as 108) upon which the error recovery procedure is to be implemented. In a preferred embodiment, the recordable medium (such as 108) is circumferentially divided into rotational tracks (such as 162) and radially divided into servo wedges (such as 164). Hence, in a preferred embodiment, the location is defined as a position on a servo data stream of a servo wedge located on a particular section (such as 162) defined by a particular rotational track (such as 162).

The method (such as in operation 404) then references the location (such as 164) on the read signal (such as 218). One way to reference the location (such as 164) is to identify the location (such as 164) by its relation between the leading edge (such as 168) of each servo wedge (such as 164) and an index (such as 166) defined by one revolution of each rotational track (such as 162). After counting (such as in operation 406) a predetermined time increment (such as 316), which, in a preferred embodiment, is an increment of 125 nanoseconds, from a specified point (such as 168) on the location (such as 164), the method corrupts (such as in operation 408) the read signal (such as 218) for the predetermined period (such as in operation 410) immediately following the time increment (such as 316). One way to corrupt the read signal (such as 218) is to cancel a first channel (such as 354) and a second channel (such as 356) of the differential read signal (such as 218). If the disruption of the read signal (such as 218) is to be maintained (such as in operation 410) for a period between 50 nanoseconds and 1 microsecond, then the predetermined period is preferably set by an analog timing circuit (such as 280). Otherwise, if the disruption of the read signal is to be maintained (such as in operation 410) for a period greater than 1 microsecond, then an analog timing circuit (such as 280) is not used.

In a preferred embodiment, monitoring (such as in operation 412) operation of the error recovery procedure is administered with a user-interfaced application (such as 202) on a computer (such as 210) having a display device in order to observe the ability of the data storage device (such as 100) to deal with the error event specifically simulated on the recordable medium (such as 108). Controlling the method for initiating the error recovery procedure is also administered through the user-interfaced application (such as 202). Once the location (such as 164) is specified (such as in operation 402) to the user-interfaced application (such as 202), the location (such as 164) is referenced (such as in operation 404) and counting (such as in operation 406) of the time increment (such as in operation 316), specified to the user-interfaced application (such as 202), is initiated, thus locating a point on the segment (such as 219) of the read signal (such as 218) corresponding to the location (such as 164) minus the time increment (such as in operation 316). The corruption (such as in operation 408) of the read signal (such as 218) is preferably initiated immediately following the time increment (such as in operation 316) and maintained (such as in operation 410) for the predetermined period, as specified to the user-interfaced application (such as 202). The corruption may include disrupting the read signal (such as 218) with more than one disruption, thus simulating (such as in operation 416) more than one error event at a predetermined fixed interval (such as in operation 338) for a predetermined number of repetitions (such as in operation 334) on the recordable medium (such as 108).

Stated another way, the present invention may be viewed as an apparatus (such as 200) for initiating an error recovery procedure in a data storage device (such as 100) having a recordable medium (such as 108) containing servo position information and delivering a differential read signal (such as 218) via a transducer (such as 118) to an interface and control logic portion (such as 212) of the data storage device (such as 100). The differential read signal (such as 218) is preferably defined as segments (such as 219) representative of information stored on a section (such as 162) of the recordable medium (such as 108). The apparatus (such as 200) has an application (such as 202) resident on a computer (such as 210), a controller (such as 206) connected to the computer (such as 210), and a signal corruption probe (such as 208) connected to the computer (such as 210) and applied to the differential read signal (such as 218). The controller (such as 206) preferably has a first counter (such as 250) for initiation of a disruption of the differential read signal (such as 218) and a second counter (such as 272) for maintaining a predetermined period of the disruption. The signal corruption probe (such as 208), preferably an optically isolated structure, simulates an error event at a specified location (such as 164) of a particular section (such as 162) of the recordable medium (such as 108) by disrupting the differential read signal (such as 218). In a preferred embodiment, the location (such as 104) is defined as a position on a servo data stream of a servo wedge (such as 164) located on a particular section (such as 162) defined by a particular rotational track (such as 162).

In a preferred embodiment, the first counter (such as 250) is used to reference the section (such as 162) on the recordable medium (such as 108) upon which the error event is to be simulated. The controller (such as 206) preferably includes a delay counter (such as 266) for counting a time delay (such as in operation 316) past the referenced section (such as 162). The error event is simulated once the delay counter (such as 266) has completed counting. In order to maintain the disruption for a predetermined period between 50 nanoseconds and 1 microsecond, the controller (such as 206) preferably includes an analog timing circuit (such as 280).

The signal corruption probe (such as 208) can be programmed to apply more than one error events into the differential read signal (such as 218) at a predetermined fixed interval for a predetermined number of repetitions (such as in operation 334), therefore, simulating an error event in more than one location (such as 164). In order to disrupt the differential read channel (such as 218), the signal corruption probe (such as 208) operatively cancels a first channel (such as 354) and a second channel (such as 356) of the differential read signal (such as 100).

It will be clear that the SERAT is well adapted to attain the ends and advantages mentioned as well as those inherent therein. While a presently preferred embodiment has been described for purposes of this disclosure, various changes and modifications may be made which are well within the scope of the SERAT. For example, the SERAT may be applied to any type of data storage device, not only a typical disc drive. Additionally, the controller may be configured in numerous other ways that don't take away from the functionality of the present invention. Further, there are numerous other ways to reference a particular location on a data storage device other than the particular method disclosed in the above description. Additionally, a transistor or other solid-state device may be used to amplify either the drive servo gate signal or the drive index signal at either drive probe on the signal corruption probe. Numerous other changes may also be made which will readily suggest themselves to those skilled in the art. Accordingly all such alterations and changes which are encompassed in the spirit of the invention disclosed above are encompassed in the invention as defined in the appended claims.

What is claimed is:

1. A method of initiating an error recovery procedure in a data storage device having a recordable medium containing servo position information and delivering a read signal via a transducer to an interface and control logic portion of the data storage device, the method comprising the steps of:
   (a) corrupting the read signal from the transducer for a predetermined period of time such that an error event is simulated in the data storage device; and
   (b) observing operation of the data storage device to ascertain the ability of the error recovery procedure to deal with the error event.

2. The method according to claim 1 wherein the read signal is a differential read signal defined as a plurality of segments along a time axis wherein each of the plurality of segments is representative of information stored on a section of the recordable medium.

3. The method according to claim 2 wherein the corrupting step (a) comprises:
   (a)(i) selecting a location on the section of the recordable medium upon which the error recovery procedure is to be implemented;
   (a)(ii) referencing the location on the differential read signal;
   (a)(iii) counting a predetermined time increment from a specified point on the location; and
   (a)(iv) corrupting the differential read signal for the predetermined period immediately following the time increment.

4. The method according to claim 3 wherein the observing step (b) comprises:

monitoring operation of the error recovery procedure with a user-interfaced application on a computer having a display device in order to observe the ability of the data storage device to deal with the error event specifically simulated on the recordable medium.

5. The method according to claim 3, wherein the selecting step (a)(i) includes fining the location as a position on a servo data stream of one of a plurality of servo wedges located on a particular section, wherein the particular section is defined by one of a plurality of rotational tracks upon which the recordable medium is divided into.

6. The method according to claim 5, wherein the referencing step (a)(ii) comprises identifying the location by a relation between a leading edge of one of the plurality of servo edges and an index defined by one revolution of one of the plurality of rotational tracks.

7. The method according to claim 3 wherein the corrupting step (a)(iv) comprises canceling a first channel and a second channel of the differential read signal.

8. The method according to claim 3 wherein the counting step (a)(iii) comprises setting the time increment to a 125-nanosecond increment.

9. The method according to claim 3 wherein the corrupting step (a)(iv) comprises maintaining a disruption of the differential read signal through the use of an analog timing circuit for a period between 50 nanoseconds and 1 microsecond.

10. The method according to claim 3 wherein the corrupting step (a)(iv) comprises maintaining a disruption of the differential read signal for a period greater than 1 microsecond.

11. The method according to claim 4, further comprising controlling the method of initiating the error recovery procedure through the user-interfaced application, such that when the step of specifying the location is communicated to the user-interfaced application, the location is referenced and the step of counting the time increment locates the segment of the differential read signal corresponding to the location minus the time increment, as specified to the user-interfaced application, wherein the step of corrupting the differential read signal is initiated immediately following the time increment and maintained for the predetermined period, as specified to the user-interfaced application.

12. The method according to claim 3 wherein the corrupting step (a)(iv) includes disrupting the differential read signal with a plurality of disruptions, such that a plurality of error events is simulated at a predetermined fixed interval for a predetermined number of repetitions on the recordable medium.

13. An apparatus for initiating an error recovery procedure in a data storage device having a recordable medium containing servo position information and delivering a differential read signal via a transducer to an interface and control logic portion of the data storage device, wherein the differential read signal is defined as a plurality of segments, wherein each of the plurality of segments is representative of information stored on a section of the recordable medium, the apparatus comprising:

an application on a computer;

a controller connected to the computer having a first counter for initiation of a disruption of the differential read signal and a second counter for maintaining a predetermined period of the disruption; and a signal corruption probe connected to the computer and applied to the differential read signal, wherein the signal corruption probe simulates an error event at a specified location of a particular section of the recordable medium by applying the disruption to the differential read signal.

14. The apparatus of claim 13 wherein the signal corruption probe is an optically isolated structure.

15. The apparatus of claim 13, wherein the first counter is used to reference the section on the recordable medium upon which the error event is to be simulated and the controller further comprises a delay counter for counting a time delay past the referenced section such that the error event is simulated once the delay counter has completed counting.

16. The apparatus of claim 13 wherein the controller comprises an analog timing circuit for maintaining the predetermined period of disruption for a period between 50 nanoseconds and 1 microsecond.

17. The apparatus of claim 13, wherein the signal corruption probe injects a plurality of error events into the differential read signal at a predetermined fixed interval for a predetermined number of repetitions, such that one of the plurality of error events is simulated in a plurality of locations.

18. The apparatus of claim 13, wherein the signal corruption probe operatively cancels a first channel and a second channel of the differential read signal.

19. The apparatus of claim 13, wherein the specified location is a position on a servo data stream of one of a plurality of servo wedges located on a particular section, wherein the particular section is defined by one of a plurality of rotational tracks of which the recordable medium is divided.

20. An error simulation device for a data storage device, the error simulation device comprising:

a signal corruption probe; and a programmable means for controlling the signal corruption probe, wherein the programmable means is used in disrupting a read signal delivered by the data storage device prior to read detection and decoding by an interface of a host systematically connected to the data storage device.

* * * * *

UNITED STATES PATENT AND TRADEMARK OFFICE
CERTIFICATE OF CORRECTION

PATENT NO.     : 6,604,211 B1
DATED          : August 5, 2003
INVENTOR(S)    : Heiman et al.

It is certified that error appears in the above-identified patent and that said Letters Patent is hereby corrected as shown below:

<u>Title page,</u>
Item [*] Notice, please correct to read as follows:

-- Subject to any disclaimer, the term of this patent is extended or adjusted under 35 U.S.C. 154(b) by 532 days. --

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,604,211 B1
DATED : August 5, 2003
INVENTOR(S) : Heiman et al.

It is certified that error appears in the above-identified patent and that said Letters Patent is hereby corrected as shown below:

<u>Column 11,</u>
Line 47, delete "30".

<u>Column 17,</u>
Line 9, delete "fining" and insert -- defining --.
Line 17, delete "edges" and insert -- wedges --.

Signed and Sealed this

Thirteenth Day of January, 2004

JON W. DUDAS
*Acting Director of the United States Patent and Trademark Office*